Patented May 23, 1950

2,508,513

UNITED STATES PATENT OFFICE 2,508,513

CONVERSION OF METHYL FORMATE TO ACETIC ACID

Walter Henry Groombridge, Spondon, near Derby, England, assignor to Celanese Corporation of America, a corporation of Delaware No Drawing. Application April 6, 1948, Serial No. 19,421. In Great Britain April 21, 1947

11 Claims. (Cl. 260—541)

This invention relates to the manufacture of organic compounds, and is more particularly concerned with the manufacture of acetic acid.

According to the present invention, acetic acid is manufactured by subjecting methyl formate to the action of heat in the presence of certain catalysts comprising carbonyl-forming metals or compounds together with halogens.

The catalysts which are used in carrying out the process of the invention may consist of one or more of the iron metals together with a halogen in the free state or in the form of a compound which is capable of yielding free halogen under the reaction conditions. Of the iron metals, nickel has been found to give the best results. The halogen may be used wholly or partly in combination with nickel, especially as a hydrated halide, e. g. $NiI_2.6H_2O$, or in the form of another metal compound such as copper iodide, an organic halogen compound such as an alkyl iodide, e. g. methyl iodide, or in the form of hydrogen iodide. Alternatively, the free halogen may be used as such. Of the halogens, iodine has been found to be the most effective, although bromine or chlorine may be used if desired.

In addition to the iron metals, certain other metals, and in particular tungsten, and metal of the fifth group of the periodic system, namely vanadium, antimony and bismuth, have also been found to be useful in the process of the invention, but their activity is very greatly enhanced by the presence of a metal of the iron group. Thus, a trace of nickel makes those metals highly active in the process, so that, for example, the catalyst used may consist of tungsten together with an iodide, e. g. copper iodide, and a trace of nickel. While the metal may be introduced into the reaction zone as a compound with the halogen it may, if desired, be wholly or partly introduced as a carbonyl, especially where nickel is used as a component of the catalyst.

The quantity of catalyst used where the catalyst is $NiI_2.6H_2O$ may in general amount to from 1 to 10% of the weight of the methyl formate or even more, although it is usually uneconomical to employ more than 15% by weight and generally quite satisfactory results are obtained when using much smaller quantities, e. g. quantities not exceeding 5% of the weight of the methyl formate. Where other substances are used as catalyst equivalent quantities of metal and halogen may be employed. It should be pointed out, however, that it is not necessary that the metal and halogen should be employed in stoichiometrical portions, for example it has been found that when using nickel as nickel carbonyl together with free iodine excellent results can be obtained when using substantially less iodine than corresponds to the formula $NiI_2$, the quantity of iodine actually employed amounting to not more than $\frac{1}{3}$ or $\frac{1}{4}$ or even less than that represented by this formula.

The reaction is preferably carried out at temperatures of about 300° C. or somewhat higher, e. g. from 300° C. to 400° C. and temperatures in the neighbourhood of 330° C. have been found to give very good results indeed. The reaction is favoured by the use of super-atmospheric pressures, and pressures of the order of 30 to 50 atmospheres may be used, but higher pressures, e. g. of 100 to 200 atmospheres, or even much higher pressures, e. g. of 200 to 400 atmospheres, may be employed if desired.

The process of the invention is especially suitable for carrying out as a batch process. Thus, an autoclave may be charged with methyl formate together with a small quantity of the desired catalytic materials and any other substances it is desired to have present, and the autoclave closed and heated to reaction temperature.

Water may be present in the reaction zone and appears to be desirable in directing the reaction towards the production of free acetic acid rather than of methyl acetate which is usually present in the reaction products. While the quantity of water present can be varied within fairly wide limits, for instance quantities equal to up to 4 or 5 or more, e. g. 10, molecular proportions per molecular proportion of methyl formate may be used, the use of quantities exceeding about 1 molecular proportion per molecular proportion of methyl formate seems to offer little advantage and unduly dilutes the acetic acid produced.

The presence of carbon monoxide is advantageous, its presence resulting in increased yields and conversions apparently by suppressing methane and carbon dioxide formation from the methyl formate used as starting material. About 1 molecular proportion of carbon monoxide per molecular proportion of methyl formate is sufficient for this purpose, but a larger quantity may be used particularly when methanol is present, the methanol and carbon monoxide in this case reacting to form additional acetic acid.

Acetic acid, methyl acetate or inert hydrocarbons may be present in the reaction zone and may act as reaction medium, particularly where the process is operated continuously. For instance, the reaction may be carried out in a column of acetic acid containing the catalyst, methyl formate in a stream of carbon monoxide being introduced at the bottom of the column and acetic acid equivalent to that produced being carried forward in the gas stream leaving the column. In such a process it is desirable to add catalyst to the entering reactants to make up for that lost in the acetic acid product being withdrawn. The quantity of carbon monoxide used in such a process may, as above indicated, be equal to 1 molecular proportion per molecular proportion of methyl formate and may be maintained at this value throughout the process, but here again the quantity used may be modified if desired, especially where methanol is present in the reactants together with methyl formate. The process of the invention may also be carried out continuously in the gas phase.

The methyl formate to be used in the process of the invention may be obtained very conveniently by isomerisation of formaldehyde, for example by heat treatment under alkaline conditions. By combination of this process with the process of the invention there is thus provided a method of converting formaldehyde directly into the more valuable acetic acid.

The following examples illustrate the invention:

Example 1

Methyl formate and water in equimolecular proportions, together with 0.14 molecular proportion of $NiI_2.6H_2O$ per molecular proportion of methyl formate, are charged into an autoclave of sufficient capacity to provide a substantial vapour space above the liquid charge; for example, the vapour space may be equal to some four times the volume of the liquid charge. The autoclave is closed and heated to a temperature of 335° C. and maintained at this temperature for 1¼ hours. Under these conditions a pressure of some 300 atmospheres develops which falls substantially when the products are allowed to cool.

On opening the autoclave a certain amount of gaseous products including methane and carbon dioxide are released to leave an aqueous liquid containing acetic acid, formic acid and methyl acetate which are separated by fractionation.

Example 2

An autoclave is charged with equimolecular proportions of methyl formate, water and carbon monoxide, together with nickel carbonyl and iodine in the molecular proportions of 1.5% and 0.4% respectively based on the methyl formate. As in Example 1 an autoclave is used which provides adequate vapour space. The autoclave is closed and heated to 335° C. for 1¼ hours and thereafter cooled and opened and the products, consisting of acetic acid, methyl acetate and some formic acid, separated by fractionation.

In this case substantially less methane and carbon dioxide was produced and both the yield and conversion were substantially higher than in Example 1.

Having described my invention, what I desire to secure by Letters Patent is:

1. Process for the manufacture of acetic acid, which comprises heating methyl formate in the presence of a carbonyl of an iron metal and a halogen selected from the group consisting of chlorine, bromine and iodine.

2. Process for the manufacture of acetic acid, which comprises heating methyl formate in the presence of nickel carbonyl and iodine.

3. Process for the manufacture of acetic acid, which comprises heating methyl formate together with nickel iodide hexa-hydrate to form acetic acid under the catalytic influence of nickel carbonyl and iodine produced in the reaction zone.

4. Process for the manufacture of acetic acid, which comprises heating methyl formate at a temperature of 300 to 400° C. and under a pressure of more than 100 atmospheres in the presence of nickel carbonyl and iodine.

5. Process for the manufacture of acetic acid, which comprises heating methyl formate at a temperature of 300 to 400° C. and under a pressure of more than 100 atmospheres together with nickel iodide hexa-hydrate to form acetic acid under the catalytic influence of nickel carbonyl and iodine produced in the reaction zone.

6. Process for the manufacture of acetic acid, which comprises heating methyl formate together with water at a temperature of 300 to 400° C. and under a pressure of more than 100 atmospheres in the presence of nickel carbonyl and iodine.

7. Process for the manufacture of acetic acid, which comprises heating methyl formate with water at a temperature of 300 to 400° C. and under a pressure of more than 100 atmospheres together with nickel iodide hexa-hydrate to form acetic acid under the catalytic influence of nickel carbonyl and iodine produced in the reaction zone.

8. Process for the manufacture of acetic acid, which comprises heating methyl formate together with carbon monoxide at a temperature of 300 to 400° C. and under a pressure of more than 100 atmospheres in the presence of nickel carbonyl and iodine.

9. Process for the manufacture of acetic acid, which comprises heating methyl formate with carbon monoxide at a temperature of 300 to 400° C. and under a pressure of more than 100 atmospheres together with nickel iodide hexa-hydrate to form acetic acid under the catalytic influence of nickel carbonyl and iodine produced in the reaction zone.

10. Process for the manufacture of acetic acid, which comprises heating methyl formate together with water and carbon monoxide at a temperature of 300 to 400° C. and at a pressure between 200 and 400 atmospheres in the presence of nickel carbonyl and iodine.

11. Process for the manufacture of acetic acid, which comprises heating methyl formate with water and carbon monoxide at a temperature of 300 to 400° C. and at a pressure between 200 and 400 atmospheres together with nickel iodide hexa-hydrate to form acetic acid under the catalytic influence of nickel carbonyl and iodine produced in the reaction zone.

WALTER HENRY GROOMBRIDGE.

REFERENCES CITED

The following references are of record in the file of this patent:

UNITED STATES PATENTS

| Number | Name | Date |
|---|---|---|
| 1,697,109 | Dreyfus | Jan. 1, 1929 |
| 1,946,255 | Carpenter | Feb. 6, 1934 |
| 2,177,600 | Brill et al. | May 17, 1938 |
| 2,457,204 | Brooks | Dec. 28, 1948 |